May 15, 1934.   L. J. HOIS   1,958,701
FILTERING STRAINER
Filed Aug. 13, 1931
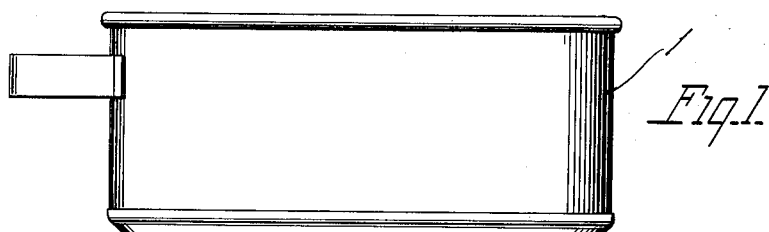
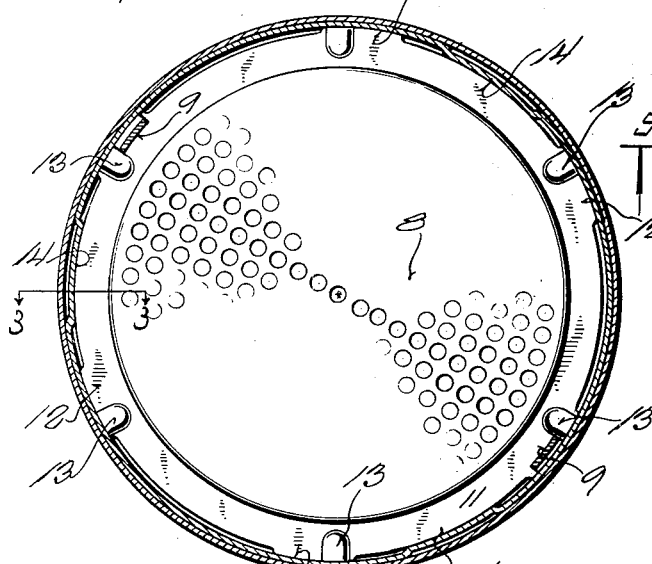
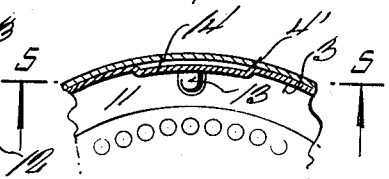
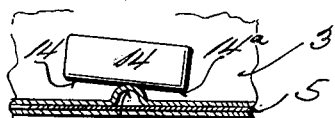
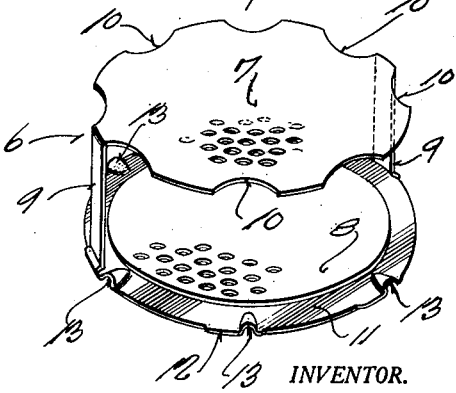
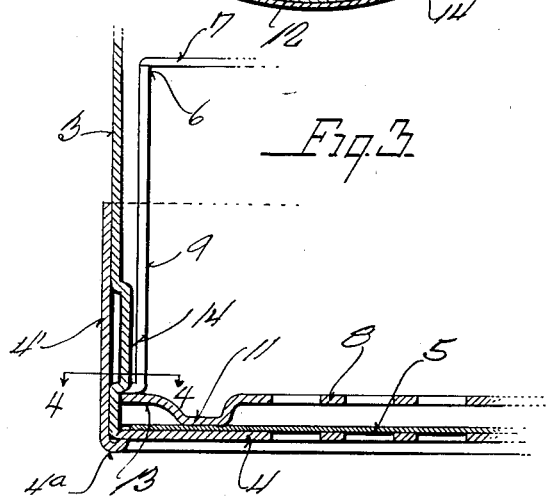
INVENTOR.
Louis J. Hois
BY
ATTORNEYS Patented May 15, 1934

1,958,701

UNITED STATES PATENT OFFICE 1,958,701

FILTERING STRAINER

Louis J. Hois, Milwaukee, Wis., assignor to Geuder, Paeschke & Frey Co., Milwaukee, Wis., a corporation of Wisconsin Application August 13, 1931, Serial No. 556,735

6 Claims. (Cl. 210—159)

This invention relates to improvements in filtering strainers, and especially to that type of a strainer especially designed and adapted for use in straining and filtering milk as it is poured into large cans for shipment.

One of the principal objects of the present invention is to provide a milk-filtering strainer of this character which precludes the stream of milk being poured therein washing away the filtering disc, that is to say, causing the fibers of the filtering disc to become bunched with the result that some portions of the disc become so thin or devoid of fibers as to permit dirt or other undesirable or foreign substances in the milk to pass through the filtering strainer and into the can. The filtering discs are usually of cotton, paper, or other suitable material.

A further object is to provide a milk-filtering strainer of this character and which is so simple in its construction and so aptly organized as to be very readily cleaned and to measure up to sanitary requirements in all respects.

In carrying out the present invention the bowl-like body of the milk-filtering strainer is formed at its lower end with a reduced cylindrical extension, to the bottom of which a perforated straining plate is suitably secured. The perforated straining plate may be integrally formed with the cylindrical extension or otherwise appropriately united thereto. On the top surface of the perforated plate the filtering disc is supported. A baffle plate and holding plate assembly is received in the cylindrical extension above the filtering disc and operates to aid in the straining action, to hold the filtering disc flatly against the perforated supporting strainer plate and to break up the stream of milk poured into the filtering strainer in such an effective manner as to preclude the so-called washing of the filtering disc. The assembly comprises upper and lower perforated plates held in spaced parallel relation by means of connecting straps, the ends of which are permanently and rigidly secured to diametrical opposite portions of the peripheries of the baffle and holding plates. In between the straps the baffle plate has its periphery formed with finger notches to facilitate manipulation of the assembly. The holding plate has a downwardly offset peripheral portion which flatly engages and exerts a clamping action upon the filtering disc. Outwardly beyond the clamping portion of the holding disc locking lugs are struck up from the disc or plate and coact with inclined locking shoulders or projections provided on the inner wall of the cylindrical extension.

With this construction the plate assembly may be easily inserted and releasably secured in position to firmly clamp the filtering disc in position and also may be readily removed. In assembling the plates with the cylindrical extension they are lowered into the extension with the locking lugs positioned in between the locking shoulders. When they are lowered as far as they may be they are partly turned, bringing the lugs into engagement with the sloping lower edges of the shoulders or projections of the extension to bring about the locking action. By reversely turning through a partial turn and then lifting, the plates may be readily removed to render accessible the filtering disc. The lower ends of the projections or shoulders are lower than the tops of the lugs to prevent locking engagement upon the reverse turning during the removal operation.

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1 is a view in elevation showing a milk-filtering strainer embodying the present invention;

Figure 2 is a view thereof in horizontal section taken on line 2—2 of Figure 1;

Figure 3 is a view in section taken on line 3—3 of Figure 2 and showing the parts in locked position;

Figure 4 is a fragmentary sectional view taken on line 4—4 of Figure 3;

Figure 5 is a fragmentary view partly in elevation and partly in section on the plane of 5—5 of Figure 4 and looking in the direction of the arrows; and Figure 6 is a detailed perspective view of the baffle and holding plate assembly.

Referring to the drawing, it will be seen that the filtering strainer embodying the present invention comprises the usual bowl 1, the lower portion of which tapers inwardly and downwardly as at 2 and then terminates in a cylindrical extension 3. The extension 3 has a perforated supporting and strainer plate 4 appropriately connected thereto. A protective collar 4' is provided for the extension 3 and has a protective bead 4ª at its lower end overlapping the margin of the plate 4. On this strainer plate 4 a filtering disc, and usually a filtering disc of cotton, paper, or the like, and designated at 5, flatly rests.

Within the extension 3 and above the disc 5 is a baffle and holding plate assembly designated generally at 6 and comprising a perforated baffle plate 7, a perforated holding and strainer plate 8 and spacing and connecting members 9, the members 9 being preferably in the form of straps of metal, the ends of which are securely and permanently connected to the plates 7 and 8 to rigidly maintain the plates in properly spaced relation, though assembled with each other.

The periphery of the baffle plate 7 in between the straps 9 is formed with finger-receiving notches 10 to permit the operator to manipulate the plate assembly with ease and effectiveness.

Adjacent the periphery of the holding disc 8 a downwardly offset annular clamping portion 11 is provided. The clamping portion 11 is provided at circumferentially spaced points with outward extensions 12, and from the portion 11 and its extensions 12 upwardly directed locking lugs 13 are struck. These locking lugs 13 are designed to coact with inclined shoulders or inwardly projections 14 pressed inwardly from the extension 3. The lugs 13 and shoulders or projections 14 provide in effect a bayonet lock whereby the baffle and holding plate assembly may be releasably secured in the extension. It will be noted that the lower edges of the shoulders 14 have an inclination or slope as indicated at 14' (see Figure 5). When the lugs 12 are brought into locking relation with the shoulders 14 they engage these sloping undersides 14' thereof and consequently when the plate assembly is turned to move the lugs 13 to the right as viewed in Figure 5 the holding plate will be forced downwardly to cause its clamping portion 11 to press against the filtering disc 5, thereby clamping the disc in position against the perforated plate 4. By having the baffle plate permanently assembled with the holding plate, it is impossible to assemble the holding plate with the other elements of the strainer without having the baffle plate in position. It follows that since the baffle plate is always in position when the filtering strainer is ready for use that washing out of the filtering disc 5 is effectively precluded. Moreover, the baffle and holding plate assembly may be easily applied and removed, and when applied, firmly clamps the filtering pad in position. By having the corner 14ᵃ of each sloping projection or shoulder below the tops of the lugs 13 accidental locking engagement or wedging engagement between the lugs 13 and shoulders 14 upon reverse turning of the plate assembly 6, and, of course, these lugs 13, when disassembling, is effectively precluded. It will be noted from Figure 2 that only three locking shoulders 14 are provided whereas there are six locking lugs 13. While, of course, the same number of locking shoulders as locking lugs may be provided, it is preferred to distribute the wear over a plurality of sets of lugs. It is to be understood that with the present construction only three lugs 13 are active at a time.

The invention claimed is:

1. A filtering strainer comprising a bowl having a perforated plate across its lower end, a filtering pad on said plate, and a baffle and holding plate assembly overlying the filtering pad and consisting of spaced perforated plates and straps fixed to and connected by said plates, one of said plates being cooperable with the filtering pad in the assembly to hold the same in position, said baffle and holding plate assembly being applied to and removed from the strainer as a unit.

2. A milk-filtering strainer having a perforated plate at its lower end adapted to support a filtering disc, a baffle and holding plate assembly including spaced perforated plates and straps rigidly interconnecting the plates, said baffle plate having finger-receiving notches, and interengageable locking means on the strainer and the holding plate for releasably securing the plate assembly in the strainer and in clamping engagement with the filtering disc under the influence of movement imparted to said baffle plate.

3. A filtering strainer having a perforated support at its outlet end, a filtering pad on said support, a unitary baffle and holding plate assembly overlying said filtering pad and comprising upper and lower perforated plates permanently connected together in spaced relation, said lower holding plate being engageable with said pad for holding it snugly against its support, said baffle and holding plate assembly acting to break up a stream of milk poured into said strainer and precluding washing away and bunching of the fibers of said filtering pad, and means for releasably securing said plate assembly within said strainer and with said holding plate in clamping engagement with the filtering pad.

4. A filtering strainer comprising a bowl having means for supporting the usual filtering pad at its outlet end, a baffle and holding plate assembly overlying the filtering pad and consisting of spaced perforated plates permanently secured together, said holding plate having means engageable with the filtering pad for holding it in position, and interengageable locking means between the strainer bowl and the holding plate for releasably securing the plate assembly in position, said baffle plate having peripheral notches to facilitate manipulation of the plate assembly.

5. A filtering strainer having means at its outlet end for supporting a filtering pad, a combined baffle and holding plate assembly including spaced perforated plates permanently secured together, said holding plate having an annular clamping portion adjacent its periphery engageable with the filtering pad, said clamping portions having locking lugs, and circumferentially spaced locking shoulders provided on the strainer and having inclined surfaces cooperable with the locking lugs for securing the plate assembly in position with the clamping portion of the holding plate in clamping engagement with the filtering pad, the inclined surfaces of the locking shoulders terminating at one end below the tops of the locking lugs to prevent accidental locking engagement upon turning of the plate assembly and the locking lugs in one direction.

6. A filtering strainer having means for supporting a filtering pad at its outlet end, a baffle and holding plate assembly overlying the filtering pad and consisting of spaced upper and lower perforated plates permanently secured together, said holding plates having means engageable with the filtering pad for holding it in position, and means operable by manipulation of said upper plate for releasably securing the baffle and holding plate in operative assembly with the strainer and with the holding plate in clamping engagement with the filtering pad.

LOUIS J. HOIS.